United States Patent
Sasaki et al.

(10) Patent No.: US 6,416,232 B1
(45) Date of Patent: Jul. 9, 2002

(54) DEVICE FOR OPTICAL CONNECTION

(75) Inventors: Kyoichi Sasaki; Ritsu Kawase; Ken Sukegawa; Tatsushi Kobayashi, all of Shizuoka; Koichi Arishima; Mamoru Hirayama, both of Tokyo, all of (JP)

(73) Assignees: Tomoegawa Paper Co., Ltd.; Nippon Telegraph and Telephone Corporation, both of Tokyo (JP)

(*) Notice: Subject to any disclaimer, the term of this patent is extended or adjusted under 35 U.S.C. 154(b) by 0 days.

(21) Appl. No.: 09/937,432

(22) PCT Filed: Mar. 30, 2000

(86) PCT No.: PCT/JP00/02006

§ 371 (c)(1),
(2), (4) Date: Sep. 27, 2001

(87) PCT Pub. No.: WO00/58765

PCT Pub. Date: Oct. 5, 2000

(30) Foreign Application Priority Data

Mar. 30, 1999 (JP) ............................................. 11-88485

(51) Int. Cl.[7] .............................................. G02B 6/38
(52) U.S. Cl. ...................................................... 385/55
(58) Field of Search ...................... 385/55–65, 88–90, 385/147

(56) References Cited

U.S. PATENT DOCUMENTS

| | | | | |
|---|---|---|---|---|
| 4,845,529 A | * | 7/1989 | Pearson et al. | 355/32 |
| 5,099,270 A | * | 3/1992 | Pearson et al. | 355/32 |
| 5,239,338 A | * | 8/1993 | Pearson et al. | 355/32 |
| 5,384,619 A | * | 1/1995 | Yokomizo et al. | 399/364 |
| 5,555,476 A | * | 9/1996 | Suzuki et al. | 349/110 |
| 5,640,189 A | * | 6/1997 | Ohno et al. | 347/112 |

FOREIGN PATENT DOCUMENTS

| | | |
|---|---|---|
| JP | 39058/1979 | 3/1979 |
| JP | 62-8011 | 2/1987 |
| JP | 7-1606 | 1/1995 |
| JP | 11-119033 | 4/1999 |

* cited by examiner

Primary Examiner—Akm E. Ullah
(74) Attorney, Agent, or Firm—McDermott, Will & Emery

(57) ABSTRACT

An optical interconnection apparatus (8) comprises a two-dimensional flexible base film (1), a plurality of optical fibers (4) with end portion for optical connection (e.g., optical connectors), and a protective resin layer (2) of plastic material filled inside edge-dam (7) formed along or in the vicinity of the peripheral edges of the base film (1). The base film (1) has an opening, in which the protective resin layer (2) covers the optical fibers (4) to fix them. A plurality of such apparatus (8) can be stacked to form a laminate. Since the base film (1) has the opening where the optical fibers (4) are routed intricately, the optical interconnection apparatus (8) has improved flexibility and can be used in a narrow space.

3 Claims, 2 Drawing Sheets

DEVICE FOR OPTICAL CONNECTION

DETAILED EXPLANATION OF THE INVENTION

1. Technical Field of the Invention

This invention relates to optical interconnection apparatus (optical circuit board) for mutually connecting optical component, parts and/or devices used in optical communications or optical information processing, such as optical components, optical circuit packs and optical circuit devices.

2. Prior Art

To permit optical interconnections between plural optical components in an optical circuit pack or optical interconnections between plural optical circuit packs or between optical circuit devices on each of which optical packs are mounted, these optical components, optical circuit packs and optical circuit devices are provided at terminals thereof with optical connectors to interconnect them together via optical fibers. As these optical fibers have to be arranged with loose in this case, it is a current circumstance that, on an optical circuit pack or inside and/or on a back side of an optical circuit devices, intricately routed lines of the optical fibers extend overlapping one another in the form of a bird's nest and hence occupy a large space. For an optical interconnection process which is complex and requires a large space as descried above, a proposal has been made, as a simple process anywhere routing of optical fibers on a two-dimensional plane as desired, to use a sheet or substrate with a pressure-sensitive adhesive coated thereon and to hold optical fibers in place by the pressure-sensitive adhesive as disclosed in JP 2,574,611 B.

Incidentally, the optical interconnection apparatus disclosed in JP 2,574,611 B is obtained in such a way that upon its fabrication, optical fibers are located by a pressure-sensitive adhesive, which is coated on a substrate (base layer) to form a routing pattern and the routing pattern is then covered with the same material as the material used for the substrate, whereby a protective layer is formed. This process is however accompanied by problems in that as optical fibers so located increase in number and the optical fibers increase more overlapped portions (cross-over routing) in the routing pattern so formed, the resulting routing layer of the optical fibers becomes thicker and, because the tacky surface with which the optical fibers are in contact becomes smaller at the overlapped portions of the optical fibers, the protective layer cannot be arranged evenly. There is a further problem in that at the overlapped portions of the optical fibers in the routing pattern, the fixing force by the pressure-sensitive adhesive becomes weaker and the optical fibers are allowed to move, thereby resulting in displacements in the routing pattern (a loss in the intactness of the routing pattern). Moreover, general optical fibers range from 125 to 250 $\mu$m in diameter so that at an overlapped area of three optical fibers, for example, the routing layer of the optical fibers becomes as thick as 375 to 750 $\mu$m. An increase in the overlapped portions of optical fibers in a routing pattern develops lifted portions (air pockets) in a protective layer around optical fibers underneath the protective layer, so that a problem arises in the reliability against temperatures and humidities and in addition, the optical circuit board becomes extremely weak to breakage which may be caused by deformation such as bending. Furthermore, since the film substrates are arranged on both sides of the two-dimensionally routed optical fibers, the optical interconnection apparatus has remarkably reduced flexibility and, hence, arrangement of extended tabs is needed upon interconnection of optical components themselves on an optical circuit pack or interconnection of optical circuit packs together. Therefore, when there is not much space for the arrangement of the optical interconnection apparatus, there is a problem that the optical interconnection apparatus cannot be used due to insufficient flexibility and bendability.

In order to solve these problems, it has been examined to fix the optical fibers extend overlapping one another by forming a resin protective layer on the optical fibers routed on an adhesive layer. In such a case, however, the optical circuit board as a whole has remarkably reduced flexibility, because the optical fibers serve as a reinforcing material in portions where the optical fibers are routed intricately with overlapped state and bendability of the optical fibers routed overlapped state, the substrate and the resin protective layer are different each other. Therefore, when there is not much space for the arrangement of the optical interconnection apparatus, there is the same problem as in the optical interconnection apparatus disclosed in JP 2,574,611B, that the optical interconnection apparatus cannot be used due to insufficient flexibility and bendability.

In order to solve the above-mentioned problems of insufficient flexibility and bendability, it has been attempted to fix and protect the routed optical fibers in a state of embedding in a resin protect layer of high flexibility without using a base film. In such a case, there is a problem that the optical interconnection apparatus has poor self-supporting ability, although their flexibility and bendability are high, and it becomes necessary to handle it with care due to difficulty of handling.

DISCLOSURE OF THE INVENTION

The present invention has been completed with a view to resolving various problems of the conventional art such as those described above. Described specifically, an object of the present invention is to provide a self-supporting optical interconnection apparatus which makes it possible to readily interconnect optical devices such as optical components, optical circuit packs and optical circuit devices, and has high flexibility and can be easily handled.

An optical interconnection apparatus according to the present invention comprises a base film having a two-dimensional plane and flexibility, plural optical fibers routed on at least one side of said base film, and a protective resin layer having flexibility by which said routed optical fibers are held in place and protected, said optical interconnection apparatus being characterized in that said base film has at least an opening so as to improve flexibility and bendability, and said optical fibers are held in place and protected in an embedded state in said protective resin layer without existence of the base film.

An optical interconnection apparatus according to a first embodiment of the present invention comprises a base film having a two-dimensional plane, plural optical fibers two-dimensionally routed on at least one side of said base film and provided at opposite ends thereof with end portions adapted to permit optical interconnections thereto, and at least one protective resin layer having flexibility by which said routed optical fibers are held in place and protected; wherein said optical interconnection apparatus is characterized in that said base film has at least an opening, and said optical fibers are fixed and protected by a protective resin layer in said opening in an embedded state.

An optical interconnection apparatus according to a second embodiment of the present invention has at least two flexible base films having a two-dimensional plane, which is characterized in that at least two optical interconnection apparatuses of the above-mentioned first embodiment are stacked to form a stacked structure.

According to the present invention, it is possible to improve flexibility of the optical interconnection apparatus, because the base film is not existent in the area where the intricately routed optical fibers having lower flexibility extend overlapping one another, and said optical fibers are held in place and protected in a form embedded in at least one of the protective resin layers having higher flexibility.

Namely, the optical interconnection apparatus of the present invention is easily handled, because a flexible base film is existent in the greater part of the apparatus, while the flexibility of the apparatus is remarkably improved, because there is no base film but a protective resin layer having larger flexibility in the area where flexibility becomes low because of the optical fibers being intricately routed or the area where flexibility is required for working. Accordingly, it becomes possible by using the optical interconnection apparatus of the present invention to easily achieve the attachment without damaging optical and mechanical properties of the optical interconnection device, when a large flexibility is required in a small space for arrangement of the optical interconnection device such as optical components, optical circuit packs and optical circuit devices.

BEST MODES FOR CARRYING OUT THE INVENTION

Figure 1:
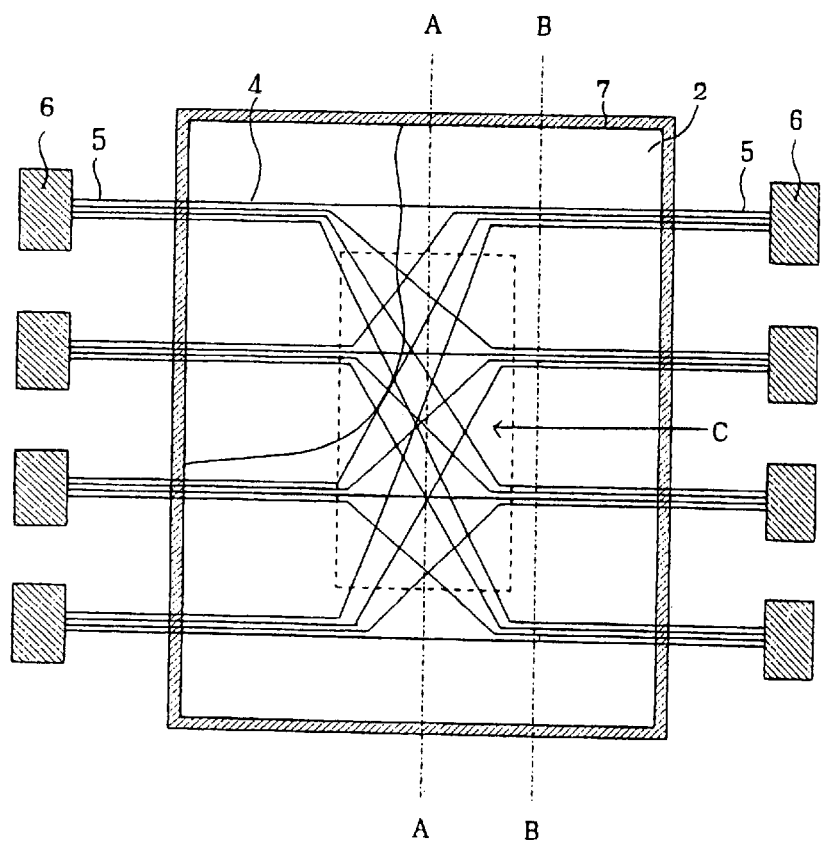
FIG. 1 is a partly cut-away top plan view of an illustrative optical interconnection apparatus according to the present invention.

Referring to the drawings, embodiments of the present invention will hereinafter be described in detail.

Figure 2:
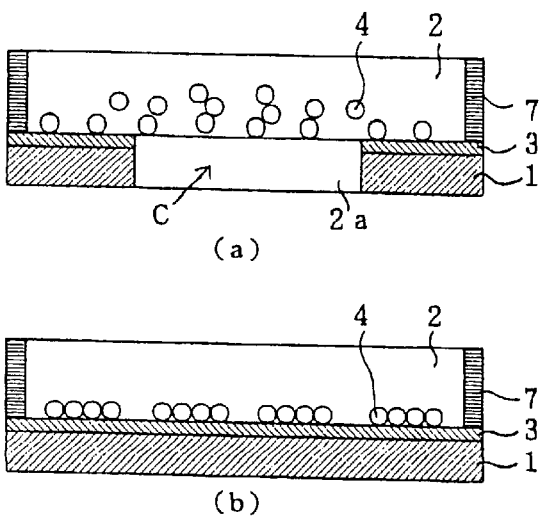
FIG. 2 is a cross-sectional view of the optical interconnection apparatus of FIG. 1.
Figure 3:
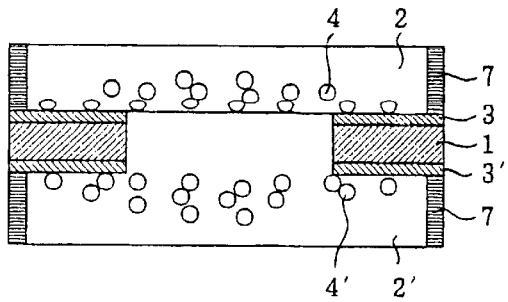
FIG. 3 is a cross- sectional view of another example of the optical interconnection apparatus according to the present invention.

FIG. 1 is a partly cut-away top plan view of an illustrative optical interconnection apparatus according to the present invention. FIG. 2(a) is a cross-sectional view of line A—A of FIG. 1 and FIG. 2(b) is a cross-sectional view of line B—B of FIG. 1. In FIG. 1 and FIG. 2, on surrounding area in the optical interconnection apparatus, plural optical fibers 4 are two-dimensionally routed via an adhesive layer 3 provided on one side of the base film 1 having flexibility, and the optical fibers 4 are fixed and protected by a protective resin layer 2 having flexibility. Opposite ends of the optical fibers 4 are formed into end portions 5 adapted to permit optical interconnections. Optical components 6, for example, optical connectors are interconnected to the end portions. The end portions 5 may be integrated with the optical components 6. Designated at numeral 7 are edge-dams arranged for the formation of protective resin layers. The center area of the optical interconnection apparatus where plural optical fibers 4 are intricately routed with overlapping one another has no base film, because the base film has an opening C. The optical fibers 4 are fixed and protected by the protective resin layer 2a having flexibility made of the same or different as or from that of the protective resin layer 2 having flexibility.

FIG. 3 to FIG. 6 are cross-sectional views of other examples of the optical interconnection apparatus according to the present invention. In the optical interconnection apparatus of FIG. 3, plural optical fibers 4' are two-dimensionally routed on the other side of the base film 1 having an opening shown in FIG. 2 via another adhesive layer 3' instead of a protective resin layer 2a. The routed optical fibers 4' are fixed and protected by the protective resin layer 2' having flexibility.

Figure 4:
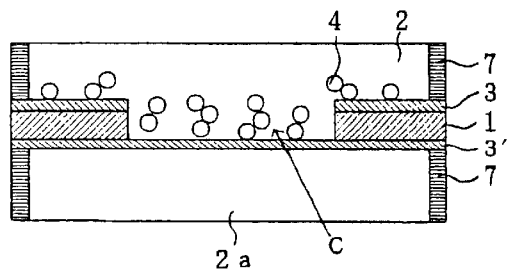
FIG. 4 is a cross-sectional view of another example of the optical interconnection apparatus according to the present invention.
Figure 5:
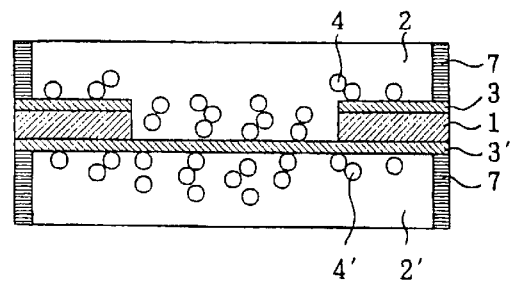
FIG. 5 is a cross-sectional view of a further example of the optical interconnection apparatus according to the present invention.
Figure 6:
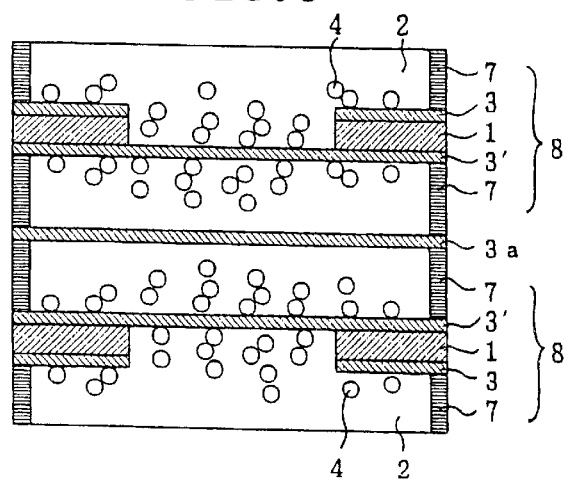
FIG. 6 is a cross-sectional view of a further example of the optical interconnection apparatus according to the present invention.

The optical interconnection apparatus of FIG. 4 has a structure that plural optical fibers 4 are fixed on one side of a flexible base film 1 having an opening by the protective resin layer 2 having flexibility, and a protective resin layer 2a having flexibility is provided on the other side of the base film 1 via an adhesive layer 3' so as to improve flexibility of the optical interconnection apparatus. In the optical interconnection apparatus of FIG. 5, plural optical fibers 4' are two-dimensionally routed via the adhesive layer 3' provided on the other side of the base film 1 as shown in FIG. 4. The routed optical fibers 4 are fixed and protected by the protective resin layer 2' having flexibility. In the optical interconnection apparatus of FIG. 6, two optical interconnection apparatuses 8 and 8 shown in FIG. 5 are bonded via an adhesive layer 3a to form a stacked structure.

In each optical interconnection apparatus according to the present invention, no particular limitation is imposed on the one or more base films having flexibility each of which has a two-dimensional plane for supporting the routed optical fibers thereon. Illustrative of the base films can include glass-epoxy resin composite substrates, polyester films, polyimide films, and gels, rubbers or foams of organic materials such as silicone or urethane. Any base film is usable insofar as it or they are employed in general electronic parts or electric parts. Further, the base films may be of any shape.

Optical fibers, which are to be routed in the present invention, can be suitably selected and used depending on the application purpose of the optical interconnection apparatus. For example, silica-made or plastic-made single-mode optical fibers, multiple-mode optical fibers or the like can be used preferably.

As an adhesive for forming adhesive layers to route optical fibers, any adhesive can be used insofar as it has adhesiveness sufficient to retain the pattern of the optical fibers in response to tensions which may be produced when the routed optical fibers are bent. Usable examples can include various pressure-sensitive adhesives, thermoplastic adhesives and thermosetting adhesives, such as urethane-base adhesives, acrylic adhesives, epoxy adhesives, nylon-base adhesives, phenol-base adhesives, polyimide-base adhesives, vinyl adhesives, silicone-base adhesives, rubber-base adhesives, fluorinated epoxy adhesives and fluorinated acrylic adhesives. From the standpoint of readiness in routing optical fibers, pressure-sensitive adhesives and thermoplastic adhesives are used preferably.

No particular limitation is imposed on the resin which makes up the one or more protective resin layers having flexibility in each optical interconnection apparatus according to the present invention, and gel-like or rubber-like organic materials, those classified as curable resins, such as ultraviolet-curing resins, electron beam curing resins and thermosetting resins, and having flexibility, thermoplastic resin having flexibility and the like can be used. More specifically, silicone gels, acrylic resin gels, fluorinated resin gels and the like can be mentioned as gel-like organic materials, and as rubber-like organic materials, silicone rubbers, urethane rubbers, fluorinated rubbers, acrylic rubbers, ethylene-acrylic rubbers, SBR, BR, NBR, chloroprene rubbers and the like can be mentioned. As curable resins having flexibility, epoxy resins, ultraviolet-curing resins, silicone resins and the like can be mentioned. As thermoplastic resins having flexibility, resins making up hot-melt adhesives, for example, polyvinyl acetate, acrylic resins such as polyethyl methacrylate and so on, polyvinyl butyral resins and polyamide resins can be mentioned.

A further protective layer may be arranged as needed on a protective resin layer of the optical interconnection apparatus, if it does not damage flexibility requiring for the optical interconnection apparatus. A 1 μm thick hard-coated silicone-based material or the like can be used as an illustrative protective layer.

In each optical interconnection apparatus according to the present invention, the optical fibers extend out from desired positions (ports) on opposite end faces of the optical interconnection apparatus so that end portions are formed. Optical connectors are attached on the end portions, or the end portions are arc-fusion-spliced with optical fibers interconnected to optical connectors. No particular limitation is imposed on the optical connectors interconnected to the optical interconnection apparatus according to the present invention, but optical single-fiber or multiple-fiber small connectors can be chosen suitably. Examples can include MPO optical connectors, MT optical connectors, MU optical connectors, and FPC optical connectors [NTT R&D, Vol.45, No. 6p589].

The following process can be suitably used for production of the above-mentioned optical interconnection apparatus according to the present invention. In a first embodiment, for example, an adhesive layer is provided on one side of a flexible base film having a two-dimensional plane to produce an adhesive sheet. Cut-off lines are then previously made on the above-mentioned adhesive sheet by cutting in order to remove the area where the flexibility deteriorates due to intricate routing patterns or the area where improvement of flexibility is required for workability and so on. Optical fibers are then routed in a desired pattern on the above-mentioned adhesive sheet. At this time, the opposite ends of the optical fibers are located extending out from the base film such that they can be adapted as end portions for permitting optical interconnections with optical connectors or the like. As a process for arranging the adhesive layer, it is possible to adopt a process, in which the adhesive layer is arranged by coating an adhesive, either as is directly or in the form of a coating material dissolved in a solvent, on the base film by a method such as roll coating, bar coating, blade coating, casting, dispenser coating, spray coating or screen coating, or another process in which an adhesive sheet with the adhesive layer formed in advance on a release film is laminated on the base film and there lease film is then removed. For the adhesive layer, a suitable thickness can be chosen and used depending on the diameter of optical fibers to be routed. Its thickness is set generally in a range of from 1 μm to 1 mm, preferably from 5 to 500 μm, more preferably from 10 to 300 μm.

On the optical fibers routed as described above, a protective resin layer is produced with a resin material having flexibility for forming the protective resin layer. A base film of the area surrounded with cut-off lines which are previously made by cutting is peeled off from the back side of the base film to form an opening. This opening is then filled with the same or different material as or from that of the above-mentioned protective resin layer to form a protective resin layer. Alternatively, after the base film for forming an opening is peeled off, optical fibers may be routed in a desired pattern on an adhesive layer which is arranged on the back side of the base film. On the routed optical fibers, a protective resin layer is then formed using the same or different material as or from that of the above-mentioned protective resin layer.

In a second embodiment of the process for production of the optical interconnection apparatus according to the present invention, an adhesive sheet consisting of a base film, an adhesive layer and a release film is prepared. A base film of an area where the flexibility becomes low or an improvement of flexibility is required is then removed together with the adhesive layer by cutting the base film. Thereafter, an adhesive sheet comprising an adhesive layer on a release film is laminated to the other side of the above-mentioned adhesive sheet to produce a double side adhesive sheet having each an adhesive layer on both sides of the base film. After the release film on the surface is peeled off, optical fibers are routed in a desired pattern and a first protective resin layer is formed on the routed optical fibers with a flexible resin material for forming the protective resin layer. The release film on the other side of the base film is then removed, and a second protective resin layer is formed with the same or different resin material as or from that of the first protective resin layer, whereby an optical interconnection apparatus having optical fibers routed on one side of the base film. In a third embodiment, after a first protective resin layer is formed as mentioned above, plural optical fibers are routed on the other side of the base film so as to have end portions adapted to permit optical interconnections. On the routed optical fibers, a second protective resin layer is formed with the same or different resin material as or from that of the first protective resin layer, whereby an optical interconnection apparatus provided with routed optical fibers on both sides of the base film can be produced.

Depending on the diameter of the routed optical fibers and the over lapped number of the routed optical fibers, a suitable thickness may be chosen for the protective resin layer with the optical fibers routed therein so that the optical fibers can be protected and held in place. In general, a thickness of (the diameter of optical fibers)×(the number of overlapped fibers) or greater is needed. For the protective resin layer without any optical fibers routed therein, on the other hand, a thickness of such an extent as reducing the stiffness of the base film may be chosen suitably depending on the application purpose of the optical interconnection apparatus. In general, the thickness is set within a range of from about 1 μm to a few cm, preferably 10 μm to 10 mm, more preferably of 30 μm to 1mm.

As a simplest process for the arrangement of the protective resin layer on the base film provided with the routed optical fibers, it can be formed by arranging an edge-dam along or in the vicinity of the peripheral edges of the above-mentioned base film, filling a resin material inside the thus-formed edge-dam and then solidifying it there. The protective layer can be formed, for example, by a process in which the resin material is formed into a coating material by dissolving it in a suitable solvent and the coating material is then added dropwise and dried, a process in which a thermosetting resin in a liquid form is added dropwise and is hardened under heat, a process in which a thermosetting resin molted by heating is added dropwise and then solidified by cooling, and a process in which a resin in a solid state is filled inside the edge-dam, is caused to melt under heat, and solidified.

It is generally sufficient if the edge-dam is arranged along or in the vicinity of the peripheral edges of the base film. Where optical components such as optical connectors, optical modulators, optical devices or the like are mounted in the vicinity of the peripheral edge of the base film, these optical components may be able to play the role of an edge-dam. In such a case, it is no longer necessary to arrange an edge-dam at the areas where the optical components are mounted.

The material for forming the edge-dam is not limited to any specific one, and preferably, can be selected suitably depending on the application purpose of the optical interconnection apparatus. In particular, a nonwoven fabric made of organic fibers such as polyethylene, polypropylene or nylon fibers, a nonwoven fabric of glass fibers, or a sealing compound (filler) of a silicone-base, epoxy-base, urethane-base or acrylic resin can be used suitably. No limitation is imposed on the size and shape of the edge-dam insofar as it can prevent the resin material, which is to be filled inside the edge-dam, from flowing out.

Further, an optical interconnection apparatus having a stacked structure can also be formed by fabricating the above-described plural optical interconnection apparatus in advance, and arranging an adhesive layer on a surface of a protective resin layer of the plural optical interconnection apparatus or arranging an adhesive layer by transferring an adhesive layer onto the surface of a protective resin layer from an adhesive sheet on which the adhesive layer has been arranged in advance, and then bonding these plural optical interconnection apparatus.

In each of the optical interconnection apparatus according to the present invention fabricated as described above, optical components such as optical connectors or optical modules are interconnected to the outwardly-extended end portions of the optical fibers. For example, the end portions of the optical fibers, said end portions having been subjected to endface treatment to attach optical connectors, are interconnected to the optical connectors, or endfaces of optical fibers interconnected to optical connectors and endfaces of respective optical fibers located extending out from the optical interconnection apparatus are arc-fusion-spliced to each other.

EXAMPLES

The present invention will hereinafter be described by examples, but the present invention shall not be limited to them.

Example 1

Provided was a base film (size: 120 mm×100 mm) with an acrylic adhesive coated to a thickness of 100 $\mu$m on a polyimide film of 125 $\mu$m in thickness. Cut-off lines were previously made on the center area of the base film so as to be a size of 30 mm×70 mm. On the adhesive layer, optical fibers (product of The Furukawa Electric Co., Ltd., 250 $\mu$m in diameter) were routed to each port (an exit of optical fibers from an optical interconnection apparatus) as will be described next. Namely, 4 optical fibers were arranged in parallel with each other at pitches of 250 $\mu$m, and 4 ports (each port was formed of 4 optical fibers) were formed at pitches of 30 mm on each of opposite sides, i.e., longer sides of the polyimide film. Each optical fiber was routed extending from one of the longer sides of the adhesive sheet to the other longer side. The routing to the individual ports on the opposite sides was designed to provide each of the optical fibers crosses at the center part of the sheet and the routing of the optical fibers was adjusted to limit the maximum over lapped number of optical fibers at 4 fibers.

Around the periphery of the polyimide film with the optical fibers routed thereon, an edge-dam of 1.5 mm in width and 1.2 mm in height was then formed by using a silicone-base filling compound (product of KONISHI CO., LTD.,"BATH BOND"). The silicone gel coating material (product of Dow Corning Toray Silicone Co., Ltd., "SE1880") was thereafter added dropwise to the inside of the edge-dam, and the silicone gel was cured under conditions of 120° C. and 1 hour to form a protective resin layer. After turning the polyimide film over, the polyimide film of 30 mm×70 mm which was surrounded with cut-off lines was removed. To the formed opening, a silicone gel coating material (product of Dow Corning Toray Silicone Co., Ltd., "SE1880") was added dropwise, and the silicone gel was cured under conditions of 120° C. and 1 hour to fill the opening with it, whereby optical fibers were held in place in an embedded state in the resin protective resin layer. Thus an optical circuit board of 1.4 mm in thickness was fabricated. MU connectors were then attached on outwardly-extended ends of the optical fibers to obtain an optical circuit board as a final product.

The fabricated optical circuit board was easily handled because the surrounding area of it has the polyimide film. Further, it was pliable and has good flexibility, because there was no base film in the center part where 3 or 4 optical fibers crossed with overlapping, and the optical fibers are fixed in an embedded form in the protective resin layer made of silicone gel.

When the optical circuit board was used for the interconnection of boards in a very limited space inside a rack, the self-supporting, flexibility and pliability of the optical circuit board made it possible to easily carry to a desired place in the board and to easily achieve interconnections between optical connectors attached to the optical circuit board and optical connectors attached to optical fibers routed in the boards. Further, when an attempt was made to bend the center part of the fabricated optical circuit board through 180° at a radius of curvature of 25 mm, it was possible to easily bend the optical circuit board without breaking the same. No damage was left on the optical fibers either.

A loss of all the interconnected optical fibers was measured. It was found to be 0.6 dB or less including losses due to the interconnections with the optical connectors. Further, with respect to optical circuit boards so fabricated, there were conducted a damp heat test (the board was left over for 5,000 hours at 75° C. and 90%RH) and a heat cyclic test (−40° C. to 75° C., 500 cycles). Variations and fluctuations in optical loss were both 0.3 dB or less. The optical circuit boards were therefore found to be satisfactorily usable as optical interconnection apparatus.

Example 2

A first protective resin layer was formed on a polyimide film by the similar manner as in Example 1 except that silicone rubber coating material (product of Toshiba Silicone Co., Ltd., "TSE-399") was used instead of the silicone gel coating material and the silicone rubber was cured under conditions of 25° C. and 24 hours. The center area (30 mm×70 mm) of the polyimide film was then removed from the back side of it.

Next, an adhesive sheet having an acrylic pressure-sensitive adhesive layer of 100 μm in thickness on a release film was prepared in advance, and it was laminated to the back side of the above-mentioned polyimide film. On the adhesive layer, optical fibers were routed in a similar manner as in Example 1. Thereafter, using a silicone-base filling compound (product of KONISHI CO., LTD., "BATH BOND"), another edge-dam of 1.5 mm in width and 1.2 mm in height was formed along peripheral edge portions of the adhesive layer. Using the silicone rubber coating material (product of Toshiba Silicone Co., Ltd., "TSE399"), a second protective resin layer was then formed by curing under conditions of 25° C. and 24 hours to fabricate an optical circuit board of 2.5 mm in thickness. The MU connectors were then attached on outwardly-extended ends of the optical fibers to obtain an optical circuit board as a final product.

The fabricated optical circuit board was easily handled because the surrounding area of it has the polyimide film. Further, it was very pliable and has good flexibility, because there was no base film in the center part of the polyimide film, where the polyimide film was sandwiched with two protective resin layers made of silicone rubber and 4 or 8 optical fibers crossed with overlapping, and the optical fibers are fixed in an embedded form in the protective resin layer made of silicone rubber.

When the optical circuit board was used for the interconnection of boards in a very limited space inside a rack, the self-supporting, flexibility and pliability of the optical circuit board made it possible to easily carry to a desired place in the board and to easily achieve interconnections between optical connectors attached to the optical circuit board and optical connectors attached to optical fibers routed in the boards. Further, when an attempt was made to bend the center part of the fabricated optical circuit board through 180° at a radius of curvature of 20 mm, it was possible to easily bend the optical circuit board without breaking the same. No damage was left on the optical fibers either.

A loss of all the interconnected optical fibers was measured. It was found to be 0.7 dB or less including losses due to the interconnections with the optical connectors. Further, with respect to optical circuit boards so fabricated, there were conducted a damp heat test (the board was left over for 5,000 hours at 75° C. and 90%RH) and a heat cyclic test (−40° C. to 75° C., 500 cycles). Variations and fluctuations in optical loss were both 0.4 dB or less. The optical circuit boards were therefore found to be satisfactorily usable as optical interconnection apparatus.

Example 3

An adhesive sheet of a size of 120 mm×100 mm having an opening of 30 mm×70 mm in the center area was produced, in a similar manner as in Example 1, by preparing a base film, cutting it and allowing to laminate a release film on the surface thereof. A release film provided with a 100 μm thick acrylic pressure-sensitive layer in advance was allowed to laminate to the back side of the polyimide film to fabricate a double side adhesive sheet having each an adhesive layer on both sides of the polyimide film.

After the release film was peeled off from the surface of the double side adhesive sheet, optical fibers were routed on the exposed adhesive layer in a similar manner as in Example 1. Around the periphery of the polyimide film, an edge-dam of 1.5 mm in width and 1.2 mm in height was then formed by using a silicone rubber coating material (product of Shin-Etsu Kagaku Co., Ltd., "KE45-T"). The silicone rubber coating material (product of Dow Corning Toray Silicone Co., Ltd., "SE1701") was thereafter added dropwise to the inside of the edge-dam, and the silicone rubber was cured under conditions of 120° C. and 30 minutes to form the first protective resin layer. After the release film of the back side of the polyimide film was removed, an edge-dam of 1 mm in width and 0.5 mm in height was then formed by using a silicone rubber coating material (product of Shin-Etsu Kagaku Co., Ltd. , "KE45-T"). The silicone rubber coating material (product of Dow Corning Toray Silicone Co., Ltd., "SE1701") was thereafter added dropwise to the inside of the edge-dam, and the silicone rubber was cured under conditions of 120° C. and 30 minutes to form the second protective resin layer. Thus an optical circuit board of 2.0 mm in thickness was fabricated. MU connectors were then attached on outwardly-extended ends of the optical fibers to obtain an optical circuit board as a final product.

The fabricated optical circuit board was easily handled because the surrounding area of it has the polyimide film. Further, it was pliable and has good flexibility, because there was no base film in the center part where 3 or 4 optical fibers crossed with overlapping, and the optical fibers are fixed in an embedded form in the protective resin layer made of silicone rubber.

When the optical circuit board was used for the interconnection of boards in a very limited space inside a rack, the self-supporting, flexibility and pliability of the optical circuit board made it possible to easily carry to a desired place in the board and to easily achieve interconnections between optical connectors attached to the optical circuit board and optical connectors attached to optical fibers routed in the boards. Further, when an attempt was made to bend the center part of the fabricated optical circuit board through 180° at a radius of curvature of 20 mm, it was possible to easily bend the optical circuit board without breaking the same. No damage was left on the optical fibers either.

A loss of all the interconnected optical fibers was measured. It was found to be 0.5 dB or less including losses due to the interconnections with the optical connectors. Further, with respect to optical circuit boards so fabricated, there were conducted a damp heat test (the board was left over for 5,000 hours at 75° C. and 90%RH) and a heat cyclic test (−40° C. to 75° C., 500 cycles). Variations and fluctuations in optical loss were both 0.2 dB or less. The optical circuit boards were therefore found to be satisfactorily usable as optical interconnection apparatus.

Example 4

Optical fibers were routed, followed by forming the first protective resin layer, in a similar manner as in Example 3.

After the release film on the back side of the polyimide film was removed, optical fibers were routed on the exposed adhesive layer in a similar manner as in Example 1. Around the periphery of the back side of polyimide film, an edge-dam of 1.5 mm in width and 1.2 mm in height was then formed by using a silicone rubber coating material (product of Shin-Etsu Kagaku Co., Ltd.,"KE45-T"). The silicone rubber coating material (product of Dow Corning Toray Silicone Co., Ltd., "SE1701") was thereafter added dropwise to the inside of the edge-dam, and the silicone rubber was cured under conditions of 120° C. and 30 minutes to form the second protective resin layer. Thus an optical circuit board of 2.5 mm in thickness was fabricated. MU connectors were then attached on outwardly-extended ends of the optical fibers to obtain an optical circuit board as a final product.

The fabricated optical circuit board was easily handled because the surrounding area of it has the polyimide film. Further, it was pliable and has good flexibility, because there was no base film in the center part where 4–8 optical fibers crossed with overlapping, and the optical fibers are fixed in an embedded form in the protective resin layer made of silicone rubber.

When the optical circuit board was used for the interconnection of boards in a very limited space inside a rack, the self-supporting, flexibility and pliability of the optical circuit board made it possible to easily carry to a desired place in the board and to easily achieve interconnections between optical connectors attached to the optical circuit board and optical connectors attached to optical fibers routed in the boards. Further, when an attempt was made to bend the center part of the fabricated optical circuit board through 180° at a radius of curvature of 25 mm, it was possible to easily bend the optical circuit board without breaking the same. No damage was left on the optical fibers either.

A loss of all the interconnected optical fibers was measured. It was found to be 0.7 dB or less including losses due to the interconnections with the optical connectors. Further, with respect to optical circuit boards so fabricated, there were conducted a damp heat test (the board was left over for 5,000 hours at 75° C. and 90%RH) and a heat cyclic test (−40° C. to 75° C., 500 cycles). Variations and fluctuations in optical loss were both 0.3 dB or less. The optical circuit boards were therefore found to be satisfactorily usable as optical interconnection apparatus.

Example 5

Two optical interconnection apparatus were fabricated in a similar manner as in Example 4. On the second protective resin layer of one of the optical interconnection apparatus, the silicone-base adhesive coating material (product of Dow Corning Toray Silicone Co., Ltd., SD4592/BY24-741/SRX212/toluene=100/1.0/0.9/50 (parts by weight)) was coated on by a dispenser coating method, followed by drying under conditions of 100° C. and 3 minutes to form an adhesive layer of 100 μm in thickness. The other optical interconnection apparatus was stacked on and laminated to the adhesive layer, whereby an optical circuit board composed of a stacked structure of 5.1 mm in thickness was fabricated.

The fabricated optical circuit board was easily handled because the surrounding area of it has the polyimide film. Further, it was very pliable and has good flexibility, because there was no base film in the center part of the polyimide film, where the polyimide film was sandwiched with two protective resin layers made of silicone rubber and 10 or more optical fibers crossed with overlapping, and the optical fibers are fixed in an embedded form in the protective resin layer made of silicone rubber.

When the optical circuit board was used for the interconnection of boards in a very limited space inside a rack, the self-supporting, flexibility and pliability of the optical circuit board made it possible to easily carry to a desired place in the board and to easily achieve interconnections between optical connectors attached to the optical circuit board and optical connectors attached to optical fibers routed in the boards. Further, when an attempt was made to bend the center part of the fabricated optical circuit board through 180° at a radius of curvature of 40 mm, it was possible to easily bend the optical circuit board without breaking the same. No damage was left on the optical fibers either.

A loss of all the interconnected optical fibers was measured. It was found to be 0.8 dB or less including losses due to the interconnections with the optical connectors. Further, with respect to optical circuit boards so fabricated, there were conducted a damp heat test (the board was left over for 5,000 hours at 75° C. and 90%RH) and a heat cyclic test (−40° C. to 75° C., 500 cycles). Variations and fluctuations in optical loss were both 0.4 dB or less. The optical circuit boards were therefore found to be satisfactorily usable as optical interconnection apparatus.

CAPABILITY OF EXPLOITATION IN INDUSTRY

As has been described above, the optical interconnection apparatus according to the present invention is easily handled because of using a base film having an opening. Further, it is pliable and has good flexibility, because the routed plural optical fibers are held in place in a form embedded in the protective resin layer having flexibility and no rigid base film is existent in the area where the optical fibers are intricately routed with overlapping. Accordingly, the optical interconnection apparatus of the present invention can be easily interconnected to optical components such as optical connectors and the like without breaking it, because the base film is existent in the parts which requires high strength. Thus, in the fabrication of optical interconnection apparatus of the present invention, the yield has been significantly improved compared with the conventional techniques.

Further, even when the optical interconnection apparatus according to the present invention was employed for interconnections in a very limited space, for example, for the interconnection of boards in a rack, its pliability and planarity make it possible to easily perform interconnections between optical components such as connectors attached to the optical interconnection apparatus and optical components such as optical connectors extended out from routed optical fibers in the board, and hence, the workability is improved substantially. Moreover, it is no longer necessary to form extended tabs for facilitating the interconnections. Therefore, the production of the optical interconnection apparatus is easy and upon mounting, it does not occupy a large space. Further, the high density of the optical circuit board is very useful because it is easy that many optical fibers are routed in the optical circuit board by the stacked structure.

What is claimed is:

1. An optical interconnection apparatus comprising a base film having a two-dimensional plane and having flexibility, plural optical fibers two-dimensionally routed on at least one side of said base film and provided at opposite ends thereof with end portions adapted to permit optical interconnections thereto, and at least one protective resin layer by which said routed optical fibers are held in place and protected; which is characterized in that said base film has at least an opening, and said optical fibers are fixed and protected by a protective resin layer in said opening in an embedded state.

2. An optical interconnection apparatus according to claim 1, wherein an edge-dam member is arranged along or in a vicinity of a peripheral edge of said base film.

3. An optical interconnection apparatus according to claim 1, wherein plural optical interconnection apparatus are stacked to fabricate a stacked structure.

* * * * *